(12) United States Patent
Bigelow et al.

(10) Patent No.: US 9,828,717 B2
(45) Date of Patent: Nov. 28, 2017

(54) LAUNDRY TREATING APPLIANCE AND TUB ASSEMBLY AND METHOD OF FORMING

(71) Applicant: Whirlpool Corporation, Benton Harbor, MI (US)

(72) Inventors: Joseph P. Bigelow, Vicksburg, MI (US); Gregory M. Garstecki, Saint Joseph, MI (US); George W. Malheiros, Saint Joseph, MI (US); Richard V. Oney, Bridgman, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 588 days.

(21) Appl. No.: 14/288,788

(22) Filed: May 28, 2014

(65) Prior Publication Data
US 2015/0345066 A1   Dec. 3, 2015

(51) Int. Cl.
| | |
|---|---|
| *D06F 37/26* | (2006.01) |
| *D06F 37/04* | (2006.01) |
| *B23P 19/04* | (2006.01) |
| *B23K 31/02* | (2006.01) |
| *B32B 37/18* | (2006.01) |

(52) U.S. Cl.
CPC .......... *D06F 37/262* (2013.01); *B23K 31/02* (2013.01); *B23P 19/04* (2013.01); *B32B 37/182* (2013.01); *D06F 37/04* (2013.01); *D06F 37/26* (2013.01); *D06F 37/261* (2013.01); *D06F 37/263* (2013.01); *B32B 2509/00* (2013.01); *Y10T 29/49828* (2015.01); *Y10T 29/49948* (2015.01); *Y10T 156/10* (2015.01)

(58) Field of Classification Search
CPC ..................................................... D06F 37/262
See application file for complete search history.

(56) References Cited

U.S. PATENT DOCUMENTS

| | | | |
|---|---|---|---|
| 5,289,703 A | 3/1994 | Hiyashi et al. | |
| 7,398,663 B2 | 7/2008 | Jo | |
| 2008/0226204 A1* | 9/2008 | Sabounjian | D06F 95/006 383/74 |
| 2008/0276658 A1* | 11/2008 | Gweon | D06F 37/262 68/139 |

FOREIGN PATENT DOCUMENTS

| | | |
|---|---|---|
| EP | 1990462 A2 | 11/2008 |
| EP | 2213778 A1 | 8/2010 |
| EP | 2602376 A2 | 6/2013 |
| KR | 100765203 B1 | 10/2007 |

OTHER PUBLICATIONS

European Search Report for Counterpart EP15164866.4, dated Oct. 9, 2015.

* cited by examiner

*Primary Examiner* — Jason Ko (57) ABSTRACT

A laundry appliance for treating a load of laundry according to a cycle of operation comprises a cabinet and a tub assembly housed within the cabinet and comprising a front tub section, a rear tub section and at least one middle tub section provided between the front and rear tub sections.

10 Claims, 11 Drawing Sheets

LAUNDRY TREATING APPLIANCE AND TUB ASSEMBLY AND METHOD OF FORMING

BACKGROUND

Laundry treating appliances, such as clothes washers, refreshers, and non-aqueous systems, may have a configuration based on a cabinet within which is housed the components of the appliance, including a tub. The tub may house a rotating drum that defines a treating chamber in which laundry items are placed for treating. The dimensions of the tub are defined in part by the space available within the cabinet which in turn define the dimensions of the drum which receive the laundry items for treatment.

BRIEF SUMMARY

According to an embodiment of the invention, a laundry appliance for treating a load of laundry according to a cycle of operation comprises a cabinet and a tub assembly housed within the cabinet and comprising a front tub section, a rear tub section and at least one middle tub section provided between the front and rear tub sections.

DETAILED DESCRIPTION

Figure 1:
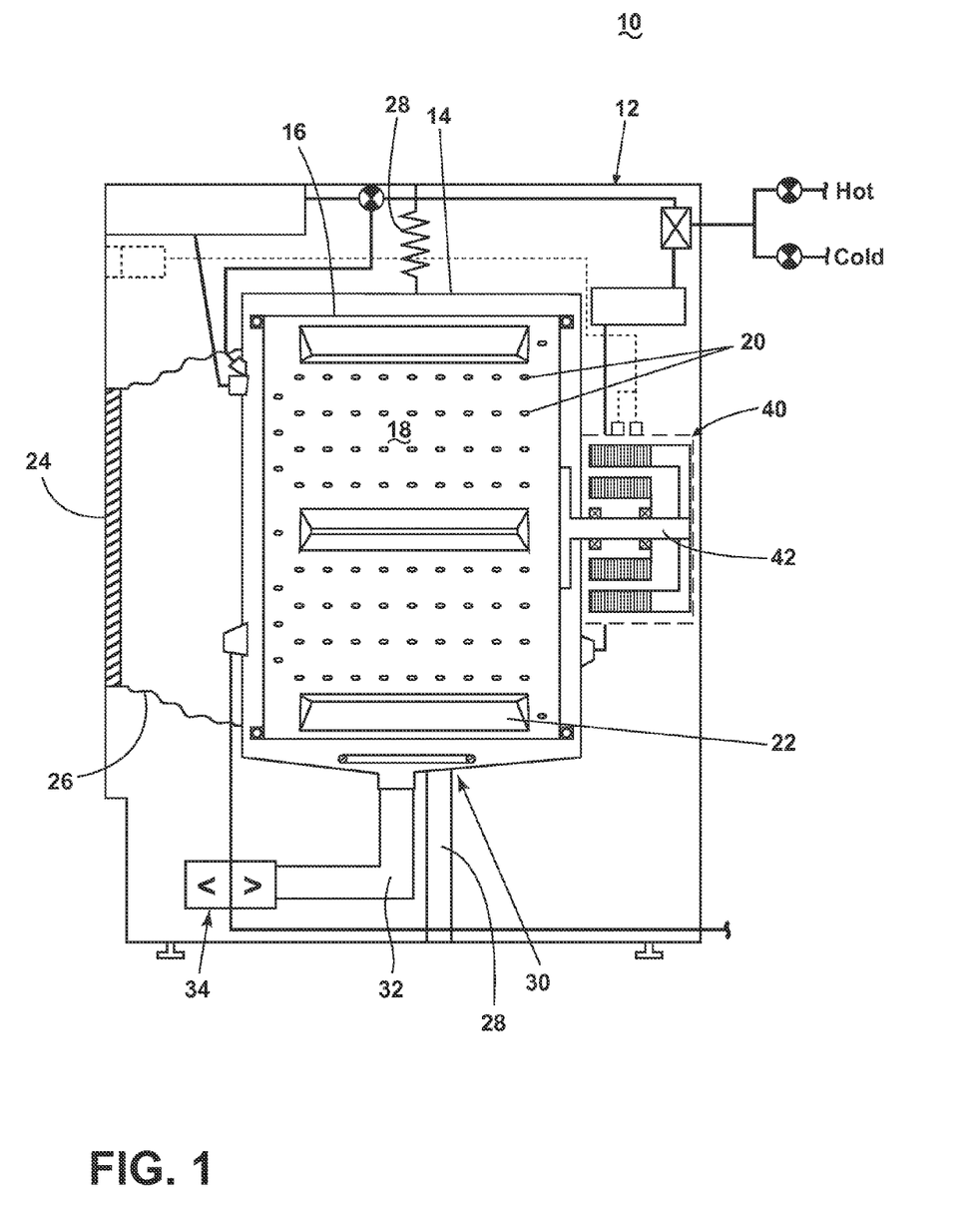
FIG. 1 is a schematic view of a laundry treating appliance in the form of a washing machine according to a first embodiment of the invention.

FIG. 1 is a schematic view of a laundry treating appliance according to an embodiment of the invention. The laundry treating appliance may be any appliance which performs a cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system comprises a tub assembly 14 supported within the cabinet 12 by a suitable suspension system and a drum 16 provided within the tub assembly 14, the drum 16 defining at least a portion of a laundry treating chamber 18. The drum 16 may include a plurality of perforations 20 such that liquid may flow between the tub assembly 14 and the drum 16 through the perforations 20. A plurality of baffles 22 may be disposed on an inner surface of the drum 16 to lift the laundry load received in the treating chamber 18 while the drum 16 rotates. It is also within the scope of the invention for the laundry holding system to comprise only a tub with the tub defining the laundry treating chamber.

The laundry holding system may further include a door 24 which may be movably mounted to the cabinet 12 to selectively close both the tub assembly 14 and the drum 16. A bellows 26 may couple an open face of the tub assembly 14 with the cabinet 12, with the door 24 sealing against the bellows 26 when the door 24 closes the tub assembly 14.

The washing machine 10 may further include a suspension system 28 for dynamically suspending the laundry holding system within the structural support system.

The washing machine 10 may further include a liquid supply system for supplying water to the washing machine 10 for use in treating laundry during a cycle of operation and a dispensing system for dispensing treating chemistry to the treating chamber 18 for use in treating the laundry according to a cycle of operation. Any suitable liquid supply system and dispensing system may be used with the embodiments of the prevent invention, the details of which are not germane to the present invention.

The washing machine 10 may also include a recirculation and drain system for recirculating liquid within the laundry holding system and draining liquid from the washing machine 10. Liquid supplied to the tub assembly 14 typically enters a space between the tub assembly 14 and the drum 16 and may flow by gravity to a sump 30 formed in part by a lower portion of the tub assembly 14. The sump 30 may also be formed by a sump conduit 32 that may fluidly couple the lower portion of the tub assembly 14 to a pump 34. The pump 34 may direct liquid to a drain conduit, which may drain the liquid from the washing machine 10, or to a recirculation conduit to direct liquid into the drum 16. In this manner, liquid provided to the tub assembly 14, with or without treating chemistry may be recirculated into the treating chamber 18 for treating the laundry within. The liquid supply and/or recirculation and drain system may be provided with a heating system which may include one or more devices for heating laundry and/or liquid supplied to the tub assembly 14, such as a steam generator and/or a sump heater, the details of which are not germane to the present invention.

The washing machine 10 also includes a drive system for rotating the drum 16 within the tub assembly 14. The drive system may include a motor 40, which may be directly coupled with the drum 16 through a drive shaft 42 to rotate the drum 16 about a rotational axis during a cycle of operation. The motor 40 may be a brushless permanent magnet (BPM) motor having a stator and a rotor. Alternately, the motor 40 may be coupled to the drum 16 through a belt and a drive shaft to rotate the drum 16, as is known in the art. Other motors, such as an induction motor or a permanent split capacitor (PSC) motor, may also be used. The motor 40 may rotate the drum 16 at various speeds in either rotational direction.

Figure 2:
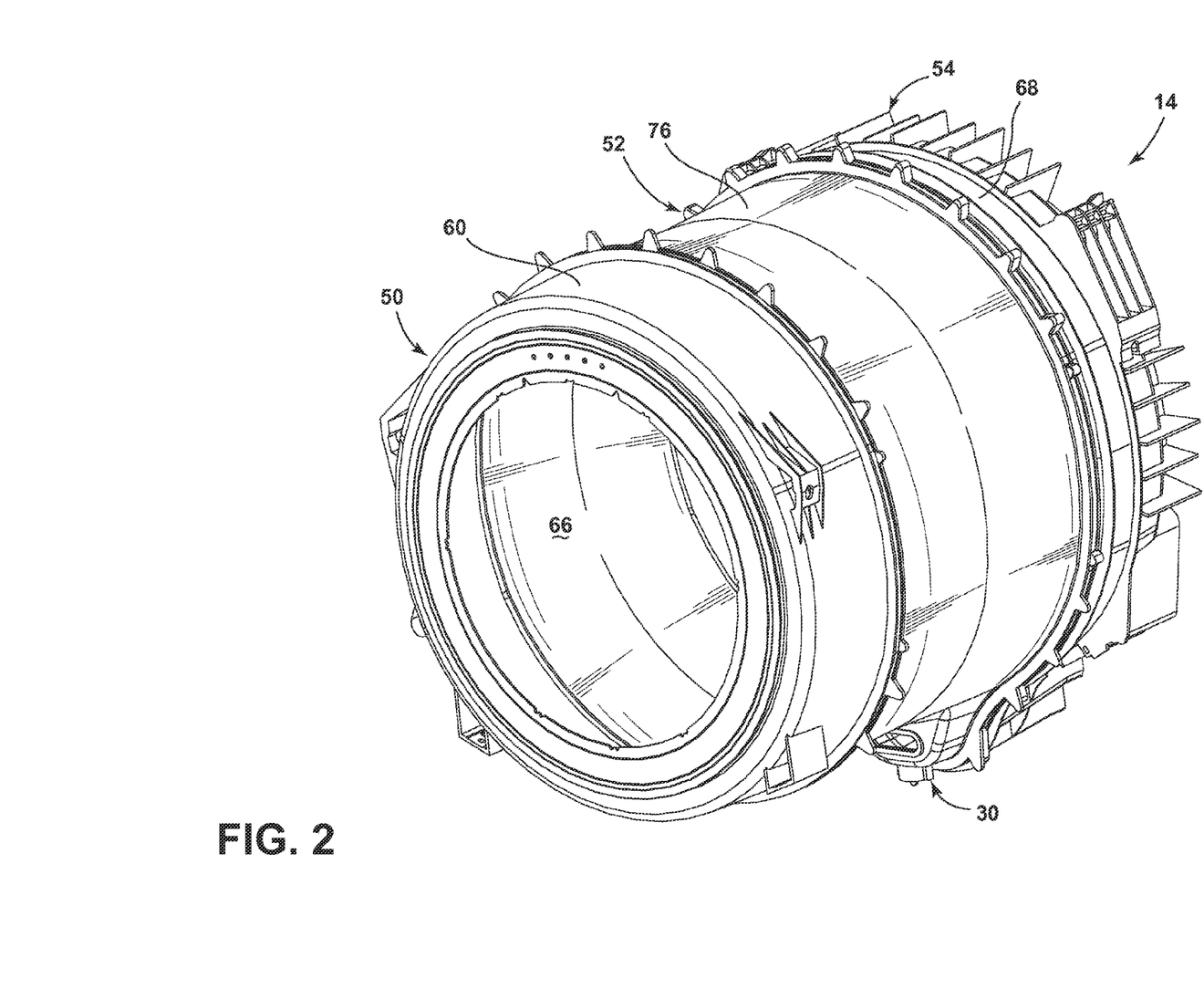
FIG. 2 is a perspective view of a tub assembly for use in the laundry treating appliance of FIG. 1 according to an embodiment of the invention.
Figure 3:
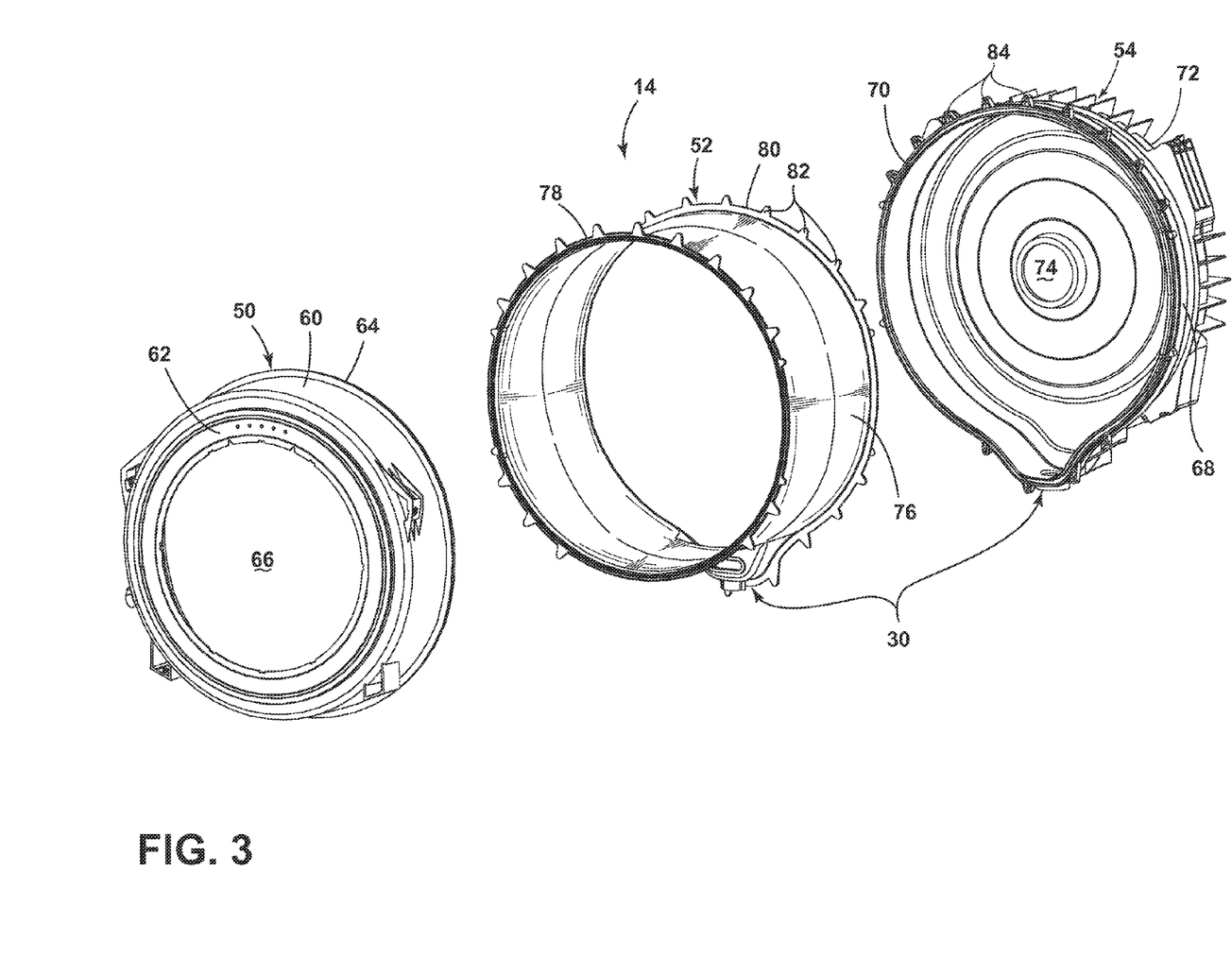
FIG. 3 is an exploded view of the tub assembly of FIG. 2 according to an embodiment of the invention.

Referring now to FIGS. 2 and 3, the tub assembly 14 includes a front tub section 50, a middle tub section 52 and a rear tub section 54. The front tub section 50 includes a front section side wall 60 extending between open first and second front section ends 62 and 64. The first end 62 may include an opening 66 that may be at least partially aligned with the door 24 and an open face of the drum 16 through which the user may load items into the drum 16 for treatment. The first front section end 62 of the front tub section 50 may be coupled with the bellows 26 to fluidly seal the opening 66 of the tub assembly 14 when the door 24 closes the tub assembly 14.

The rear tub section 54 may include a rear section side wall 68 extending between an open first rear section end 70 and a closed second rear section end 72. The closed second rear section end 72 may include an opening 74 through which the drive shaft 42 may extend for coupling the motor 40 with the drum 16. The rear tub section 54 may also include at least a portion of the sump 30. The middle tub section 52 includes a middle section side wall 76 extending between an open first middle section end 78 and an open second middle section end 80. A portion of the sump 30 is formed in the rear tub section 54 and a portion of the sump 30 is formed in an adjacent portion of the middle tub section 52. Alternatively, the sump 30 may be formed entirely in either the rear tub section 54, middle tub section 52, or the front tub section 50 or in a portion of all three of the front, middle and rear tub sections 50, 52, and 54, or the sump 30 may not be formed in any of the tub sections 50, 52, and 54 without deviating from the scope of the invention.

Each of the front, middle and rear tub sections 50, 52, 54 may be attached to an adjacent tub section 50, 52, 54 by any mechanical and/or non-mechanical fastener. In the exemplary embodiment illustrated in FIG. 3, the front section 50 may be coupled with the middle tub section 52 by joining the second front section end 64 with the first middle section end 78 by welding. The weld may be any suitable type of weld, non-limiting examples of which include an ultra-sonic welding, high frequency welding, friction welding, laser welding, pressure welding, and/or heat welding. The middle tub section 52 may include fastening elements 82 which align with corresponding fastening elements 84 on the rear tub section 54 such that the second middle section end 80 of the middle tub section 52 may be coupled with the first rear section end 70 using mechanical fasteners, such as bolts or pins. It is also within the scope of the invention for both the front and rear tub sections 50, 54 to be coupled with the middle tub section 52 by welding or by mechanical fasteners. In another example, the front tub section 50 may be coupled with the middle tub section 52 by mechanical fasteners while the rear tub section 54 is coupled with the middle tub section 52 by welding.

The front, middle and rear tub sections 50, 52, and 54 may all be made from the same or different materials. In one example, the front, middle and rear tub sections 50, 52, and 54 may be made from a polymeric material, with each section made by a molding process, such as injection molding. The front, middle and rear tub sections 50, 52, and 54 may each be made from the same or a different polymeric material. In another example, the front and rear tub sections 50 and 54 may be made from a polymeric material while the middle tub section 52 is made from a metal-based material that has been casted to form the tub section.

Figure 4:
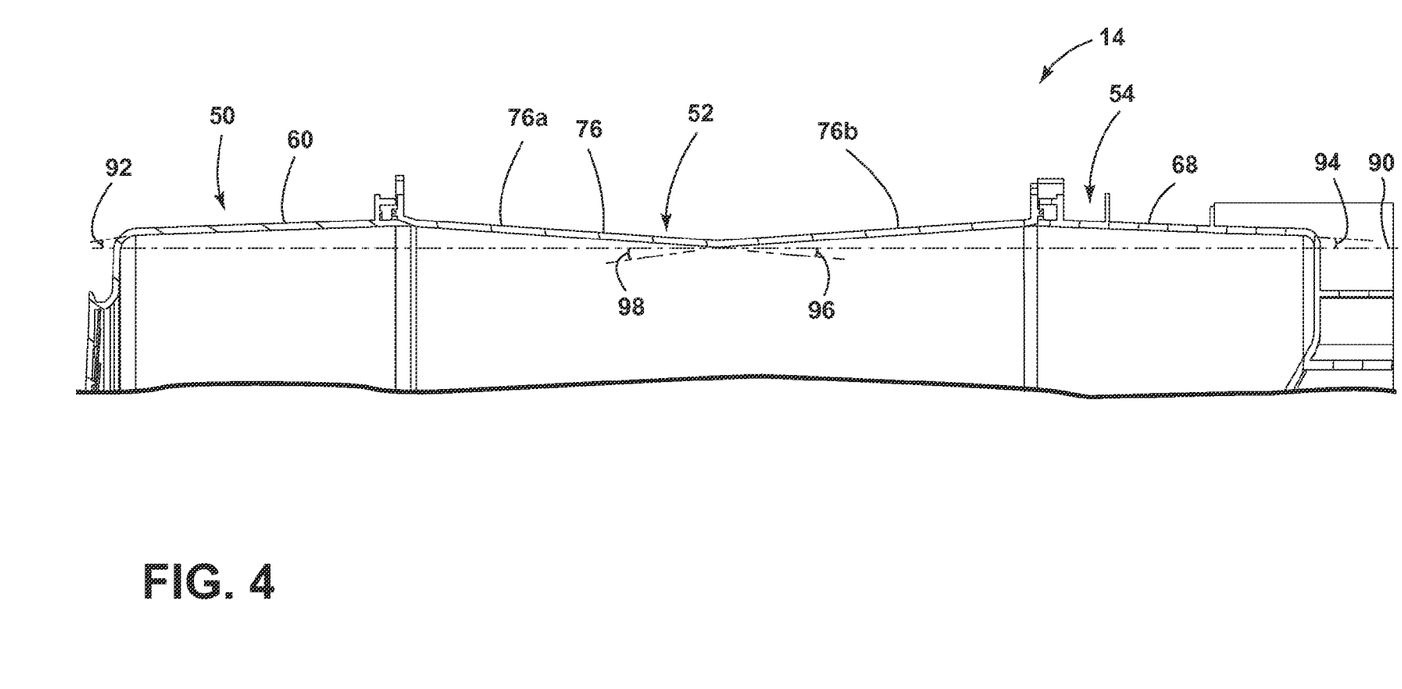
FIG. 4 is a cross-sectional view of a portion of the tub assembly of FIG. 2 according to an embodiment of the invention.
Figure 5:
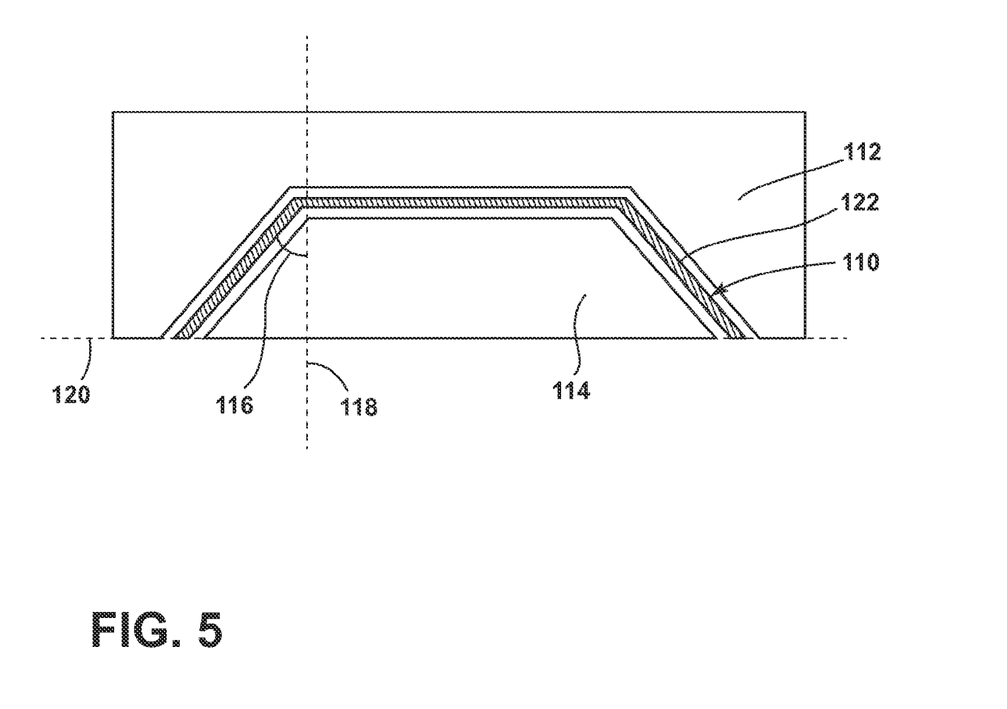
FIG. 5 is a schematic illustration of a male and female mold for forming a part.

Referring now to FIG. 4 each of the side walls 60, 76, and 68 of the front, middle and rear tub sections 50, 52, and 54, respectively, may include a draft with respect to a longitudinal axis 90 of the tub assembly 14. A brief explanation of draft and the use of draft within the context of the embodiments of the invention may be helpful. Draft is a term used in the art of molding and casting parts to refer to an amount of taper for a part perpendicular to a parting line of the part. Referring to FIG. 5, consider an arbitrary part 110 formed within a female mold 112 and a male mold 114. The side walls of the female and male molds 112, 114 may be provided with a draft to facilitate release of the part 110 from the molds 112 and 114. A draft angle 116 of an inner wall of the part 110 may be determined with respect to an axis 118 perpendicular to a parting line 120 of the part 110. An outer wall of the part 110 may also be provided with a draft angle that is the same or different than the draft angle 116. The draft on the part 110 provides the part 110 with a side wall 122 having a taper. In a similar manner, each of the side walls 60, 76, and 68 of the front, middle and rear tub sections 50, 52, and 54 may be provided with at least one draft to facilitate release of the tub sections 50, 52, and 54 from the molds and/or casts used to form the tub sections, providing the side walls 60, 76, and 68 with a taper or draft.

Figure 6A:
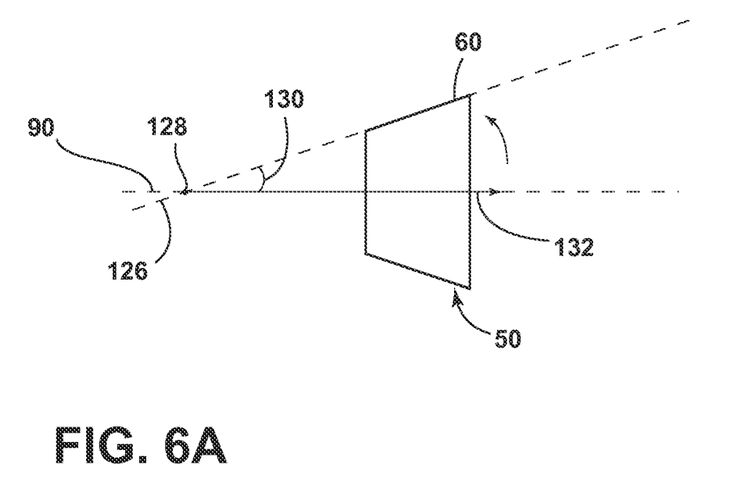
FIGS. 6A and 6B are schematic views of a cross-sectional view of a tub portion arranged such that a side wall of the tub portion has a positive and negative angle, respectively, with respect to a longitudinal axis of the tub portion according to an embodiment of the invention.
Figure 6B:
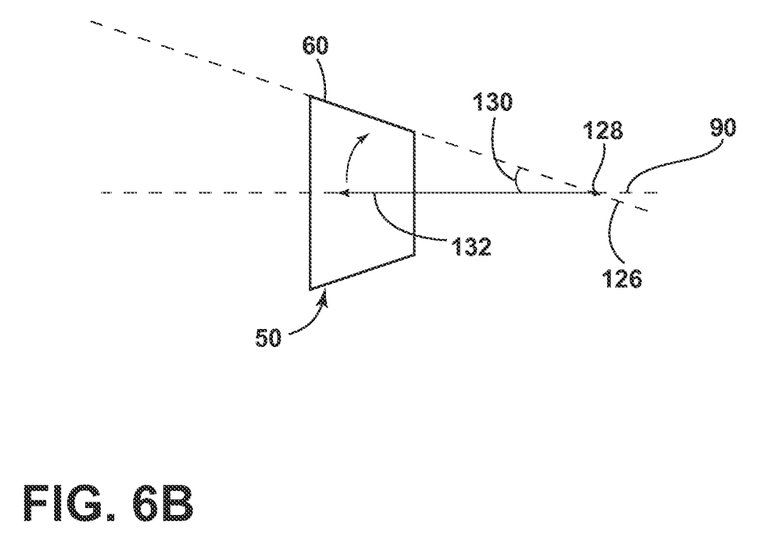

Draft angles may be provided in molded or cast parts to facilitate releasing the part from the mold or cast without distortion or damage. In the context of injection molding a plastic part, the high pressures during the molding process may force the plastic to come into contact with the surfaces of the mold's cores and cavities. The cavity may become so tightly packed with plastic that it is difficult to remove the part from the mold. In some cases, the part may shrink, which may make it easier to remove the part from the mold, but may also result in the part sticking to the mold's cores. Providing a part with a draft angle may facilitate removal of the part from the mold, particularly when high pressure injection molding processes are used, the part is large and/or the part is thin walled. These considerations, as well as the characteristics of the material used to mold the part, such as the material's shrinkage properties. Typically, the larger the draft angle, the easier it is to remove the part from the mold. However, the draft angle affects the dimensions of the part. For example, the part 110 in FIG. 5 is illustrated as having a draft such that a base of the part is narrower than an opening of the part, which results in the part 110 have a smaller volume than a similar part in which there was no draft and the base was the same width as the opening. Each of the tub sections, 50, 52, and 54 may be arranged relative to the longitudinal axis 90 such that the taper or draft of the side walls 60, 76, and 68 are at alternating positive and negative angles with respect to the longitudinal axis 90. Referring now to FIGS. 6A and 6B in which a schematic of the front tub section 50 is illustrated for the purposes of discussion, the front tub section 50 may be arranged relative to the longitudinal axis 90 such that a plane 126 defined by the side wall 60 intersects the longitudinal axis 90 at a vertex 128. When an angle 130 created by rotating a ray 132 aligned with the longitudinal axis 90 from the longitudinal axis 90 to the plane 126 is created by rotating the ray 132 counterclockwise about the vertex 128, the angle 130 is a positive angle, as illustrated in FIG. 6A. When the angle 130 is created by rotating the ray 132 clockwise about the vertex 128, the angle 130 is a negative angle. In this manner, the front tub section 50 may be arranged along the longitudinal axis 90 such that the side wall 60 is oriented relative to the longitudinal axis 90 at a positive angle or a negative angle.

Referring again to FIG. 4, the side wall 60 of the front tub section 50 may include a draft forming a front section draft angle 92 with respect to the longitudinal axis 90. The front section draft angle 92 may be an acute, positive angle with respect to the longitudinal axis 90. The side wall 68 of the rear tub section 54 may include a draft forming a rear section draft angle 94 with respect to the longitudinal axis 90. The rear section draft angle 94 may be an acute, negative angle with respect to the longitudinal axis 90. The rear section draft angle 94 may have the same or different magnitude as the front section draft angle 92.

The side wall 76 of the middle tub section 52 may include a first side wall portion 76a having a first middle section draft angle 96 with respect to the longitudinal axis 90 and a second side wall portion 76b having a second middle section draft angle 98 with respect to the longitudinal axis 90. The first middle section angle 96 may be an acute, negative angle and the second middle section angle 98 may be an acute, positive angle having a magnitude the same or different than the first middle section angle 96.

As illustrated in FIG. 4, the front, middle and rear tub sections 50, 52, and 54 are assembled such that the side walls 60, 76a, 76b, and 68 have alternating positive and negative draft angles 92, 96, 98, and 94, respectively. The magnitude of each of the draft angles 92, 96, 98, and 94 may be the same or different from one or more of the other draft angles 92, 96, 98, and 94. In an exemplary embodiment, the draft angles 92, 96, 98, and 94 may be within 0.5 to about 3 degrees. This range is typically within the capability of the manufacturing process.

While the side walls 60, 76, and 68 of the front, middle and rear tub sections 50, 52, and 54 are illustrated as having a draft on both an inner and outer surface of the side walls 60, 76, and 68, it is within the scope of the invention for the draft to be present on only the inner or the outer surface of the side walls 60, 76, and 68. In addition, the side wall draft may extend only partially about the circumference of the tub section. For example a portion of the middle tub section side wall 76 and rear tub section side wall 68 is interrupted by the sump 30, thus interrupting the draft angle in these areas of the side walls 76 and 68 (see FIGS. 2 and 3).

While FIG. 4 illustrates the middle tub section 52 as being in the form of a single part having two integrally formed side wall portions defined by two draft angles 96, 98, it is within the scope of the invention for the middle tub section 52 to be formed by two or more separate sections without deviating from the scope of the invention. The two or more separate middle sections may be assembled to adjacent tub sections using any suitable mechanical and/or non-mechanical fasteners as described above with respect to the front, middle and rear tub sections 50, 52, and 54.

Figure 7:
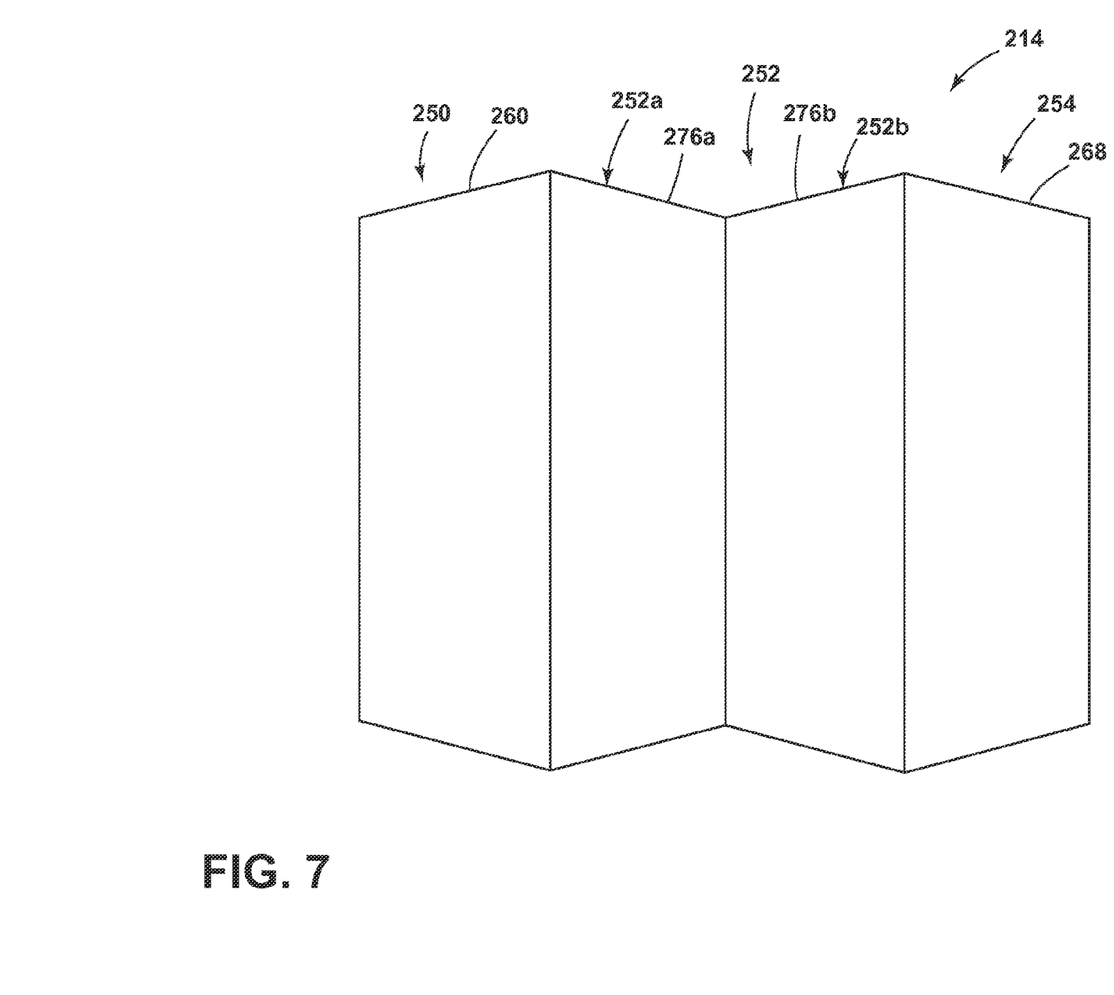
FIG. 7 is a schematic cross-sectional view of a tub assembly according to an embodiment of the invention.
Figure 8:
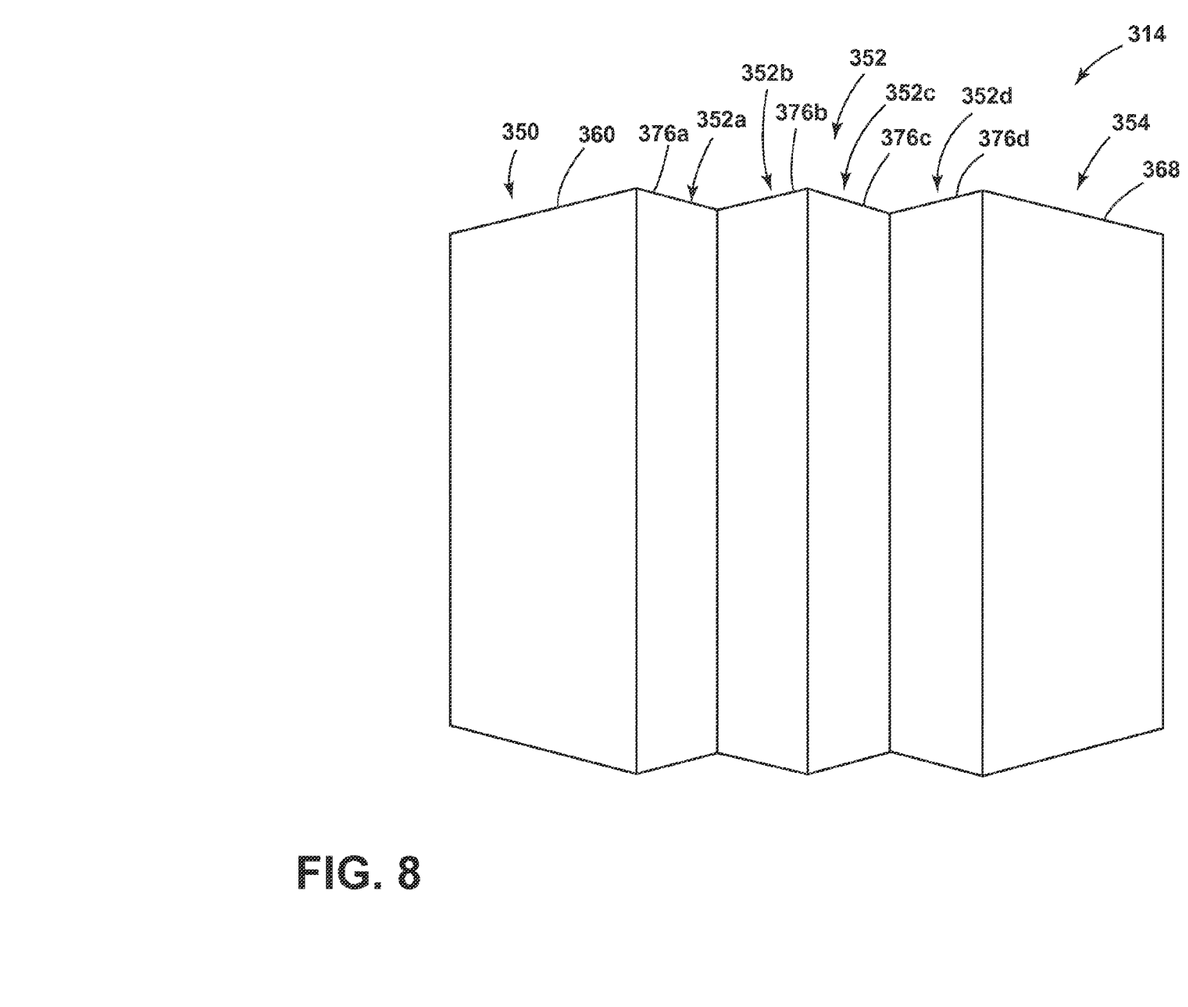
FIG. 8 is a schematic cross-sectional view of a tub assembly according to an embodiment of the invention.
Figure 9:
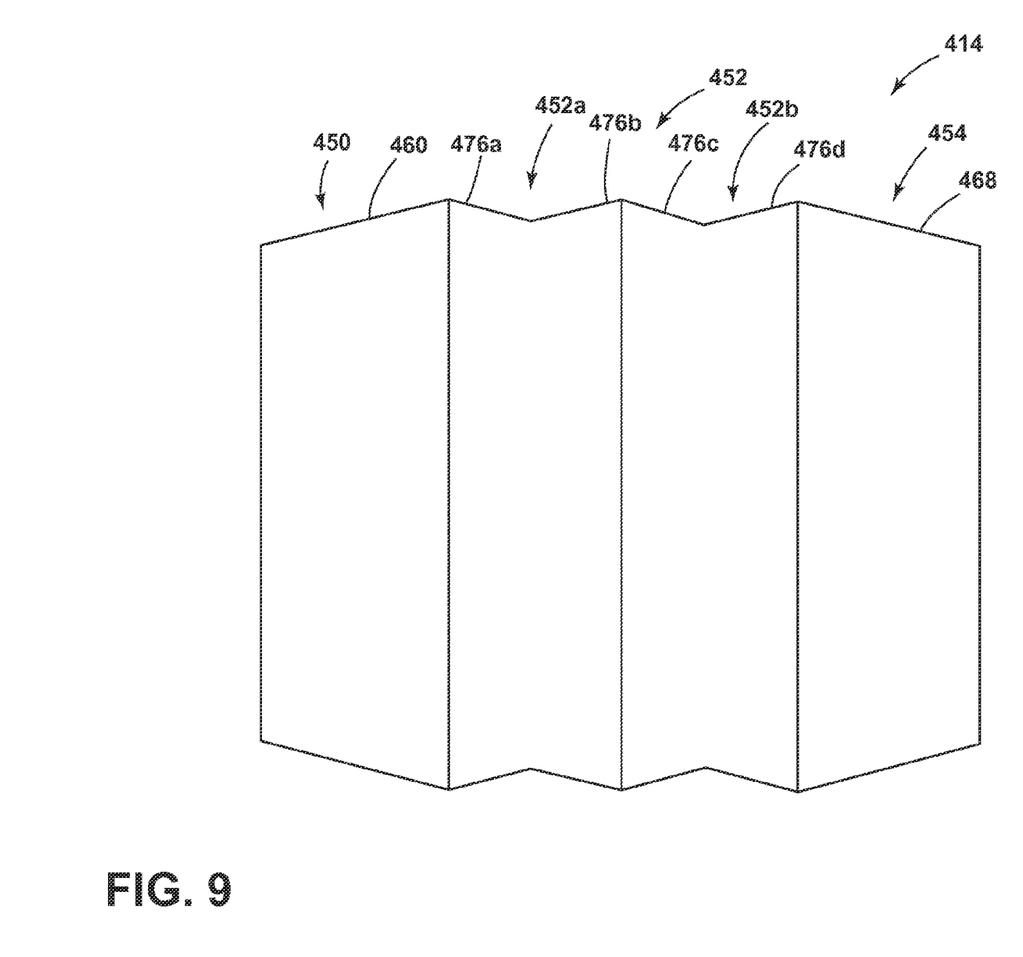
FIG. 9 is a schematic cross-sectional view of a tub assembly according to an embodiment of the invention.

FIGS. 7-9 schematically illustrate exemplary alternative tub assemblies 214, 314, and 414 which are similar to the tub assembly 14 except for the combination of tub sections and tub section draft angles used to form the tub assembly. Therefore, elements of the tub assemblies 214, 314, and 414 similar to the tub assembly 14 are numbered with the prefix 200, 300, and 400, respectively. For the purposes of discussion, each tub section or portion of a tub section may be exemplified by a frustum. The dimensions and angles are not drawn to scale with the angles exaggerated for the purposes of discussion.

FIG. 7 illustrates a tub assembly 214 in which the front tub section 250 has a side wall 260 formed with a positive draft angle and a rear tub section 254 having a side wall 268 formed with a negative draft angle. The middle tub section 252 of the tub assembly 214 may include a first middle tub section 252a coupled on one end with the front tub section 250 and having a side wall 276a with negative draft angle and a second middle tub section 252b coupled on one end with the rear tub section 254 and having a side wall 276b with a positive draft angle. The first and second middle tub sections 252a and 252b may be individual sections that are coupled together to form the tub assembly 214. In this manner the tub assembly 214 may be formed by four separate sections 250, 252a, 252b, and 254 assembled such that the draft angles of each section 250, 252a, 252b, and 254 are arranged in alternating directions while the magnitude of each draft angle may be the same or different from one or more of the other draft angles.

FIG. 8 illustrates a tub assembly 314 in which the middle tub section 352 of the tub assembly includes first, second, third and fourth middle tub sections 352a, 352b, 352c, and 352d assembled such that the draft angles for each section 352a, 352b, 352c, and 352d are arranged in alternating directions. The first middle tub section 352a has a side wall 376a with a negative draft angle that is coupled at one end with the front tub section 350 and at an opposite end with the second middle tub section 352b. The second middle tub section 352b has a side wall 376b with a positive draft angle and is coupled at one end with the first middle tub section 352a and on an opposite end with the third middle tub section 352c. The third middle tub section 352c has a side wall 376c with a negative draft angle and is coupled at one end with the second middle tub section 352b and on an opposite end with the fourth middle tub section 352b. The fourth middle tub section 352d has a side wall 376d with a positive draft angle and is coupled at one end with the third middle tub section 352c and on an opposite end with the rear tub section 354. In this manner the tub assembly 314 may be formed by six separate sections 350, 352a, 352b, 352c, 352d, and 354 assembled such that the draft angles of each section 350, 352a, 352b, 352c, 352d, and 354 are arranged in alternating directions while the magnitude of each draft angle may be the same or different from one or more of the other draft angles.

While FIG. 8 illustrates the middle tub section 352 being formed by four sections 352a, 352b, 352c, and 352d having draft angles arranged in alternating directions, it will be understood that the middle tub section may be formed by any number of sections having draft angles arranged in alternating directions.

FIG. 9 illustrates a tub assembly 414 in which the middle tub section 452 is formed from first and second middle tub sections 452a and 452b each having multiple draft angles arranged in alternating directions. The first middle tub section 452a includes a side wall portion 476a having a negative draft angle and a side wall portion 476b having a positive draft angle. The second middle tub section 452b includes a side wall portion 476c having a negative draft angle and a side wall portion 476d having a positive draft angle. The first and middle tub sections 452a and 452b can be assembled with the front and rear tub sections 450 and 454 such that the draft angles of each section 450, 452a, 452b, and 454 are arranged in alternating directions.

While the tub assemblies 14, 214, 314, and 414 are illustrated as being formed from front and rear tub sections 50 and 54, 250 and 254, 350 and 354, and 450 and 454, respectively, that have a side wall 60 and 68, 260 and 268, 360 and 368, and 460 and 468, with a draft angle, it is also within the scope of the invention for either or both of the front and rear tub sections 50 and 54, 250 and 254, 350 and 354, and 450 and 454, respectively, to not have a side wall with a draft angle.

Forming the tub assembly from a front tub section, at least one middle tub section and a rear tub section each having at least one drafted side wall affects the capacity inside the tub as well as the diameter of the opening to the tub through which items are loaded to be treated, both of which may be important to the user of the laundry treating appliance. The tub assembly may be divided into multiple pieces having one or more drafted side walls to increase the capacity of the tub and to also increase the diameter of the opening to the tub, which makes loading items into the tub easier for the user.

Figure 10:
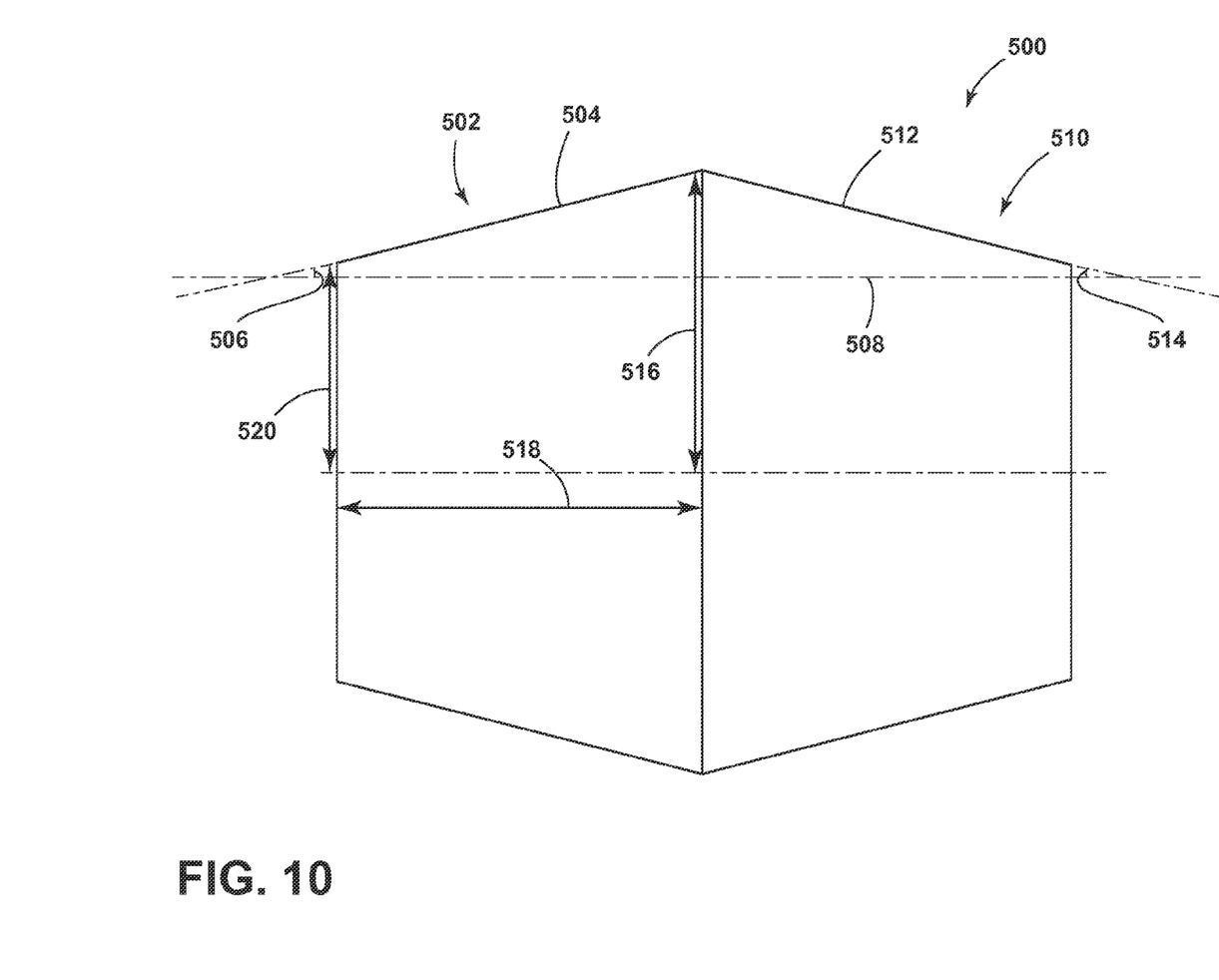
FIG. 10 is a schematic cross-sectional view of a traditional tub assembly.

FIG. 10 schematically illustrates a traditional tub assembly 500 which includes a front tub section 502 having a side wall 504 with a positive draft angle 506 with respect to a longitudinal axis 508 coupled with a rear tub section 510 having a side wall 512 with a negative draft angle 514. For the purposes of discussion, the front and rear tub sections 502 and 510 may be considered frustums with the frustum forming the rear tub section 510 having the same dimensions as the frustum forming the front tub section 502. The frustum forming the front and rear tub sections 502 and 510 may have a first or base radius 516, a length 518 and a second radius 520. The second radius 520 of the frustum forming the front tub section 502 corresponds to the opening in the front tub section 502 through which a user may load items to be treated. For simplicity sake for the purposes of discussion, the dimensions of the frustums are not drawn to scale and the draft angles have been exaggerated for the purposes of discussion.

Figure 11:
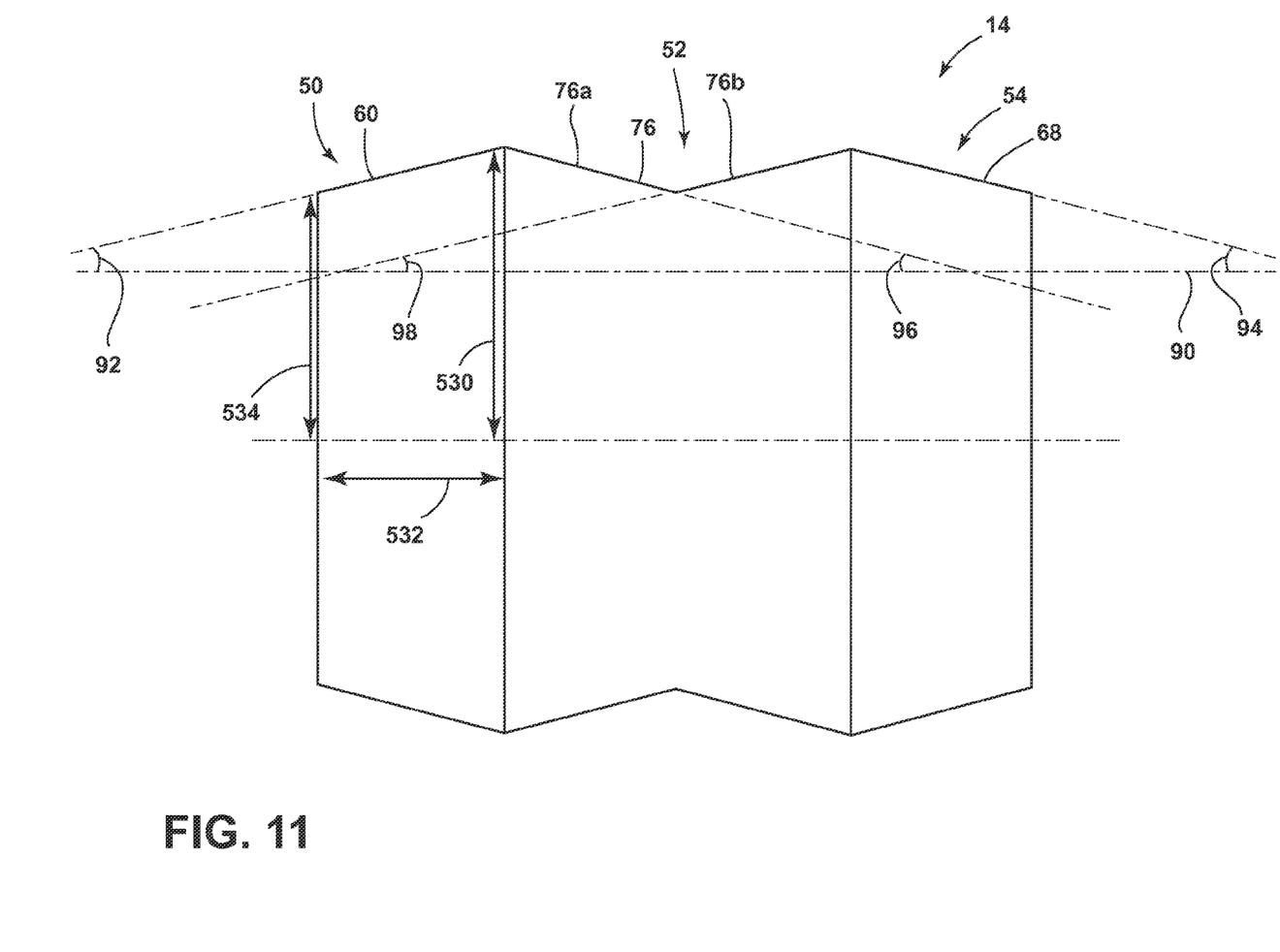
FIG. 11 is a schematic cross-sectional view of the tub assembly of FIG. 2 according to an embodiment of the invention.

FIG. 11 schematically illustrates the tub assembly 14 of FIGS. 2-4 for comparison with the traditional tub assembly 500 of FIG. 10. For the purposes of discussion, the front and rear tub sections 50 and 54 are each represented by a frustum while the middle tub section 52 is represented by a pair of frustums. For simplicity sake for the purposes of discussion, the dimensions of the frustums forming the front, middle and rear tub sections 50, 52, and 54 are the same, although not to scale and the draft angles have been exaggerated. The frustum forming the tub assembly 14 may have a first or base radius 530, a length 532 and a second radius 534. The second radius for the frustum forming the front tub section 50 corresponds to the radius of the opening 66 in the front tub section 50 through which a user loads items to be treated.

Table 1 provides exemplary dimensions for the tub assembly 500 of FIG. 10 and the tub assembly 14 of FIG. 11 having the same total length of the tub assembly and the same side wall draft angle.

TABLE 1

Exemplary Tub Assembly Dimensions

| Tub assembly | Draft angle (degrees) | Total tub assembly length (mm) | Section length (mm) | First radius (mm) | Second radius (mm) | Tub volume (m³) |
|---|---|---|---|---|---|---|
| Tub assembly 500 | 2 | 520 | 260 | 622 | 612 | 0.622 |
| Tub assembly 14 | 2 | 520 | 130 | 630 | 625 | 0.643 |

As illustrated in Table 1, for a given draft angle and total tub assembly length, decreasing the height of the tub sections and using more than two tub sections to form the tub assembly provides a corresponding increase in the first and second radii of the tub. The first and second radii of the tub assembly 14 increase by 8 mm and 13 mm, respectively, compared to the traditional tub assembly 500. The increase in the first and second radii provides an increase in the effective internal diameter of the tub assembly 14 as well as increases the tub opening through which items to be treated are loaded. The increase in the first and second radii also results in a corresponding increase in the internal volume of the tub, increasing the volume for the tub assembly 14 by more than 3% compared to the traditional tub assembly 500.

The draft angle for molded or cast parts of the dimensions typically found for laundry appliance tubs is generally in the range of 0.5 to 3 degrees, which is primarily driven by manufacturing requirements. Forming the tub assembly from a front tub section having a drafted side wall, at least one middle tub section having at least one drafted side wall and a rear tub section having a drafted side wall as described herein provides increase flexibility in the tub capacity and the load opening dimensions within a given range of draft angles and total tub assembly length. Providing one or more middle tub sections having one or more draft angles also provides flexibility in designing the tub assembly by allowing different middle tub sections to be used with a given set of front and rear tub sections to provide the desired tub capacity and load opening dimensions. In addition, the increased tub capacity results in less unused space within the cabinet.

To the extent not already described, the different features and structures of the various embodiments of the tub assemblies 14, 214, 314, and 414 may be used in combination with each other as desired. That one feature may not be illustrated in all of the embodiments of the tub assemblies 14, 214, 314, and 414 is not meant to be construed that it cannot be, but is done for brevity of description. Thus, the various features of the different embodiments of the tub assemblies 14, 214, 314, and 414 may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A laundry appliance for treating a load of laundry according to a cycle of operation comprising:
   a cabinet;
   a tub assembly having a longitudinal axis, housed within the cabinet and comprising:
      a front tub section having a first side wall with a first draft forming a first acute angle relative to the longitudinal axis;
      a rear tub section having a second side wall with a second draft in a direction opposite to the first draft and forming a second acute angle relative to the longitudinal axis; and
      a middle tub section provided between the front tub section and the rear tub section, comprising a third side wall having a third draft in a direction opposite to the first draft and forming a third acute angle relative to the longitudinal axis and a fourth side wall having a fourth draft in a direction opposite to the second and third drafts and forming a fourth acute angle relative to the longitudinal axis;

wherein the fourth side wall is positioned between the second side wall and the third side wall such that an angle formed where the fourth side wall and the third side wall meet opens away from an interior of the tub assembly.

2. The laundry appliance of claim 1 wherein the third side wall and the fourth side wall are integrally formed.

3. The laundry appliance of claim 1 wherein the front tub section is coupled to the middle tub section by at least one of a mechanical fastener or a weld, or both.

4. The laundry appliance of claim 3 wherein the rear tub section is coupled to the middle tub section by at least one of a mechanical fastener or a weld, or both.

5. The laundry appliance of claim 3 wherein the front tub section is coupled to the middle tub section by a mechanical fastener or a weld and the rear tub section is coupled to the middle tub section by the other of the mechanical fastener or weld.

6. The laundry appliance of claim 1 wherein at least one of the front tub section, the rear tub section or the middle tub section are formed from a molded polymeric material.

7. The laundry appliance of claim 6 wherein the middle tub section is formed from a casted metal-based material.

8. The laundry appliance of claim 6 wherein the front tub section, the rear tub section and the middle tub section are formed from a molded polymeric material.

9. The laundry appliance of claim 1 wherein the first acute angle has a magnitude and a direction and the second acute angle has a magnitude that is the same as the first acute angle and a direction that is opposite of the first acute angle.

10. The laundry appliance of claim 9 wherein a magnitude of the third acute angle and a magnitude of the fourth acute angle is the same as the magnitude of the first and second acute angles.

* * * * *